United States Patent [19]
Friedman

[11] Patent Number: 5,975,812
[45] Date of Patent: Nov. 2, 1999

[54] CUTTING INSERT

[75] Inventor: Jacob Friedman, Kfar Vradim, Israel

[73] Assignee: Iscar Ltd., Migdal Tefen, Israel

[21] Appl. No.: 09/037,759

[22] Filed: Mar. 10, 1998

[30] Foreign Application Priority Data

Mar. 11, 1997 [IL] Israel .......................................... 120422

[51] Int. Cl.⁶ .................................................. B23B 27/04
[52] U.S. Cl. ............................. 407/114; 407/113; 407/115
[58] Field of Search ...................................... 407/113–117

[56] References Cited

U.S. PATENT DOCUMENTS

| | | | |
|---|---|---|---|
| 2,176,265 | 10/1939 | Luers . | |
| 2,688,791 | 9/1954 | Luers et al. . | |
| 2,891,300 | 6/1959 | Shephard . | |
| 3,821,837 | 7/1974 | Faber ........................................... | 29/95 |
| 5,007,775 | 4/1991 | Pantzar ..................................... | 407/113 |
| 5,156,502 | 10/1992 | Satran . | |
| 5,232,319 | 8/1993 | Satran et al. ............................. | 407/114 |
| 5,372,463 | 12/1994 | Takahashi et al. ...................... | 407/114 |
| 5,388,932 | 2/1995 | DeRoche et al. ........................ | 407/113 |
| 5,810,519 | 9/1998 | Vogel et al. .............................. | 407/114 |

FOREIGN PATENT DOCUMENTS 535 083   3/1973   Switzerland .

WO 94/27772   12/1994   WIPO .

*Primary Examiner*—Daniel W. Howell
*Assistant Examiner*—Mark Williams
*Attorney, Agent, or Firm*—Pennie & Edmonds LLP

[57] ABSTRACT

A cutting insert (1) has an insert body (2) with an upper central clamping surface (3) and a lower clamping surface (4) through which passes an axis of symmetry (A) about which the cutting insert is indexable. The insert body (2) has a pair of opposite and identical cutting end portions (8A,8B) disposed laterally with respect to the upper clamping surface. The cutting end portions (8A,8B) each have a rake surface (9A,9B), a front cutting edge (11A,11B) and side cutting edges (15A,16A,15B,16B). Planes (20A,20B) passing through the midpoints (21A,21B) of the front cutting edges (11A,11B) and being normal thereto are inclined in opposite senses with respect to the axis of symmetry (A) in an end view of the cutting insert. A front cutting edge (11A) has at least two component cutting edges (22A,23A,25A), each pair of adjacent component cutting edges (22A, 23A;23A,25A) overlapping via a common bridging section (26A,27A) thereby providing chip splitting means, each component cutting edge (22A,23A,25A) being associated with localized chip control means (27A,29A,30A) including chip breaking means.

17 Claims, 7 Drawing Sheets

CUTTING INSERT

FIELD OF THE INVENTION

This invention relates to cutting inserts for deep grooving operations in general and deep face grooving applications in particular.

BACKGROUND OF THE INVENTION

In U.S. Pat. No. 5,156,502, there is illustrated and described a double ended cutting insert having an insert body with an upper central clamping surface and a lower clamping surface through which passes an axis of symmetry about which the cutting insert is indexable. A pair of opposite cutting end portions laterally disposed with respect to the upper central clamping surface are each provided with a front cutting edge adapted to cut a chip of the same width as the cutting edge.

In an end view of the cutting insert, planes passing through the midpoints of the front cutting edges and being normal thereto are inclined in opposite senses with respect to its axis of symmetry whereby the projection of one front cutting edge is less than the width of the other front cutting edge when the latter is disposed horizontally so as to maximize its width in a top view of the cutting insert.

By virtue of this construction, together with suitably tapering side surfaces, the cutting insert is particularly adapted for deep face grooving operations, namely, at depths of cut greater than its length. However, up to the present time, such operations are performed at a relatively slow stock removal rate.

SUMMARY OF THE INVENTION

In accordance with the present invention, there is provided a cutting insert comprising:

an insert body having an upper central clamping surface and a lower clamping surface through which passes an axis of symmetry about which the cutting insert is indexable, said insert body having a pair of opposite cutting end portions disposed laterally with respect to said upper clamping surface and each having a rake surface, a front cutting edge and side cutting edges, planes passing through the midpoints of said front cutting edges and being normal thereto being respectively inclined in opposite senses with respect to said axis of symmetry in an end view of the cutting insert, characterized in each of said front cutting edges having at least two component cutting edges, each pair of adjacent component cutting edges overlapping via a common bridging section thereby providing chip splitting means, each component cutting edge being associated with localized chip control means including chip breaking means.

In a forward feed of a cutting insert of the present invention, its operative cutting end portion splits a chip into the same number of chip strips as its associated component cutting edges, maintains the flow of each chip strip in a direction substantially opposite to the forward feed direction of the cutting insert and subsequently breaks each chip strip into relatively short chips which can then be readily evacuated. As a consequence, the cutting insert of the present invention facilitates a higher stock removal rate particularly in deep face grooving operations than a conventional insert of the same type.

BRIEF DESCRIPTION OF THE DRAWINGS

In order to understand the invention and to see how it may be carried out in practice, preferred embodiments are now be described, by way of non-limiting example only, with reference to the accompanying drawings, in which.

DETAILED DESCRIPTION OF PREFERRED EMBODIMENTS

Figure 1:
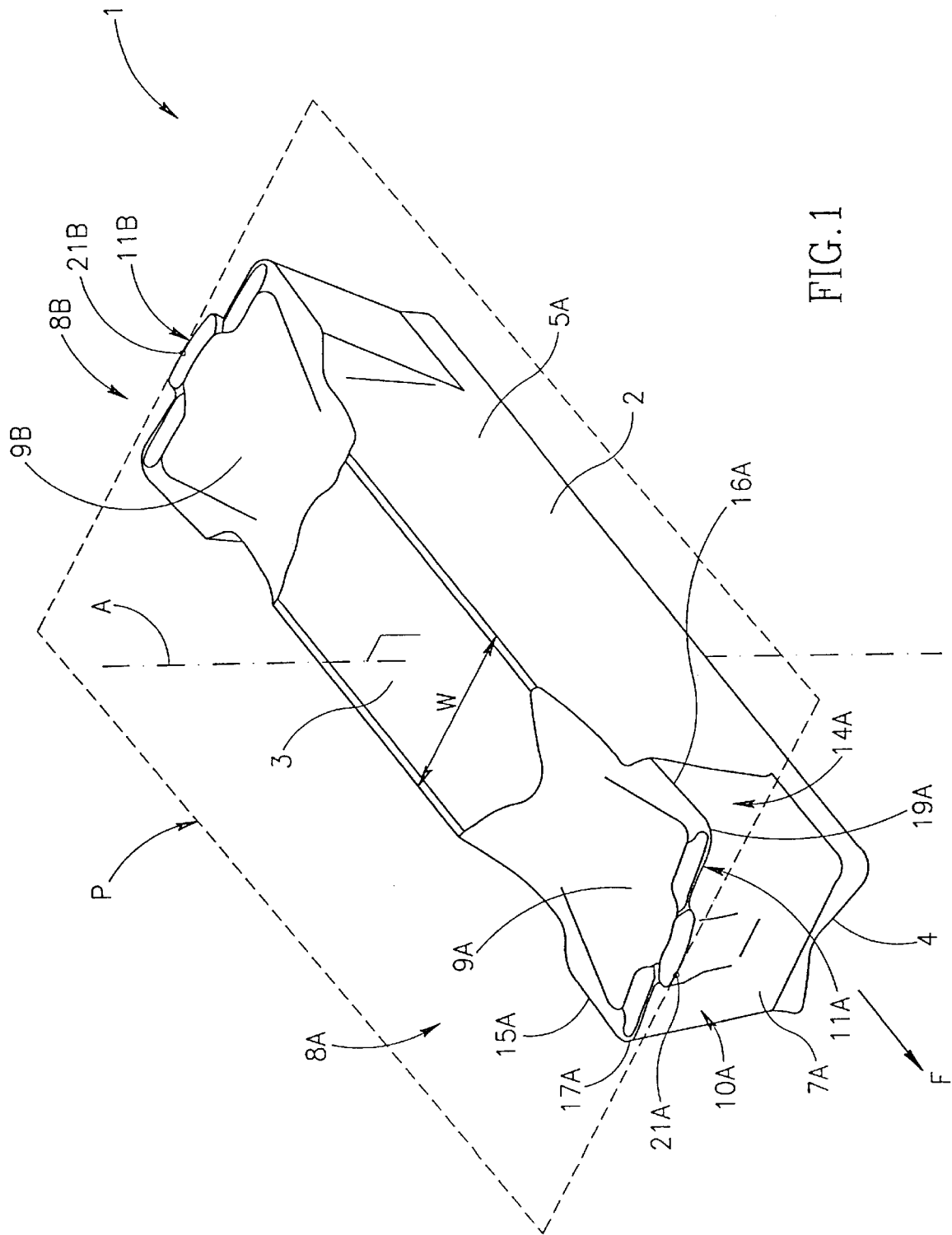
FIGS. 1 and 2 are perspective and end views of a first embodiment of a cutting insert of the present invention, respectively.

With reference now to the drawings, FIG. 1 shows a double ended cutting insert 1 having an insert body 2 with an upper central grooved clamping surface 3, a lower grooved clamping surface 4, side surfaces 5A and 5B (not shown) and end surfaces 7A and 7B (not shown). The insert body 2 has a pair of opposite cutting end portions 8A and 8B laterally disposed with respect to the upper central grooved clamping surface 3 and indexable about an axis of symmetry A which passes through the clamping surfaces 3 and 4.

Cutting end portions 8A and 8B are identical and therefore are described with respect to the former only for the sake of conciseness. The cutting end portion 8A has a rake surface 9A which intersects a front relief flank 10A at a front cutting edge 11A and side relief flanks 13A (not shown) and 14A at side cutting edges 15A and 16A, respectively. The front cutting edge 11A meets the side cutting edges 15A and 16A at cutting comers 17A and 19A, respectively.

Figure 2:
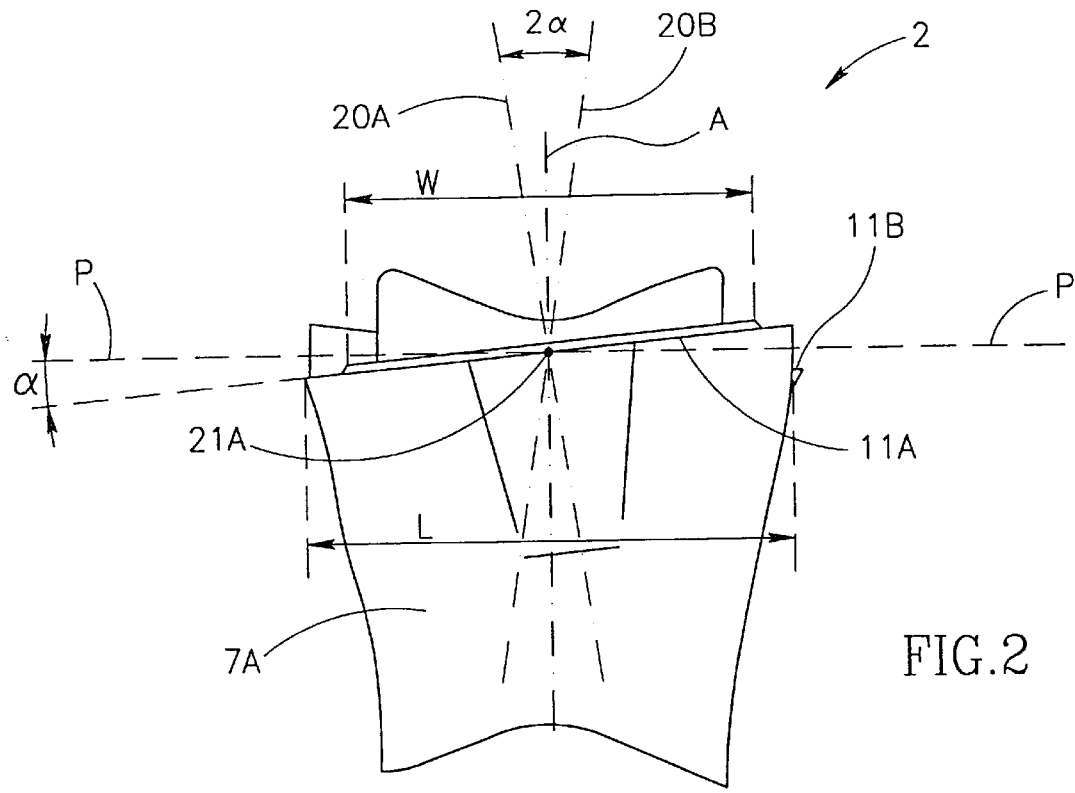

FIG. 2 shows that a plane 20A passing through a midpoint 21A of the front cutting edge 11A is inclined with respect to the axis of symmetry A by an acute angle α in a first sense and that a plane 20B passing through a midpoint 21B of the front cutting edge 11B is inclined with respect to the axis of symmetry A by an acute angle α in a second sense whereby the planes 20A and 20B subtend an angle 2α therebetween.

As seen in FIGS. 1 and 2, the axis of symmetry A is normal to an imaginary reference plane P which contains midpoints 21A and 21B. Front cutting edges 11A and 11B are each inclined in opposite senses at an angle a with respect to this imaginary reference plane P. Also, as best seen in FIG. 2, the front cutting edges 11A and 11B are sloped in opposite senses with respect to the axis of symmetry A in an end view of the insert, taken along a line perpendicular to the axis of symmetry and passing through a midpoint.

Figure 3:
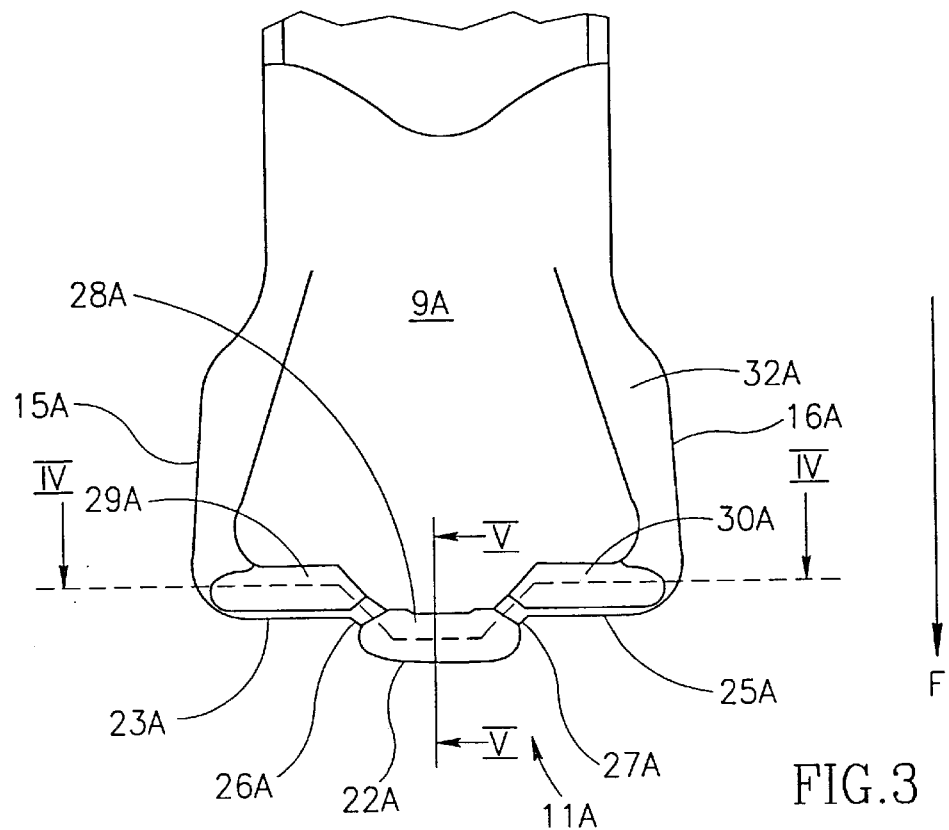
FIG. 3 is top view of one end of the insert of FIG. 1.

FIG. 3 shows that the front cutting edge 11A is constituted by three component cutting edges, namely, a central component cutting edge 22A protruding in a forward feed direction F with respect to lateral component cutting edges 23A and 25A, thereby providing a staggered configuration in a top view of the cutting insert taken along a line parallel to said axis of symmetry. The central component cutting edge 22A overlaps the lateral component cutting edges 23A and 25A in a transverse direction to the feed direction F via S-shaped common bridging sections 26A 25 and 27A, respectively, thereby ensuring that a chip cut by the front cutting edge 11A is split into three chip strips. As best seen in FIGS. 1 and 2, because the ends of adjacent component cutting edges overlap, the component cutting edges collectively form a composite front cutting edge, which in an end view of the insert, has a length L which exceeds a width W of the insert body at said upper central clamping surface. The central component cutting edge 22A is preferably chevron shaped, thereby providing piloting for the cutting insert 1 in the feed direction F.

Figure 4:
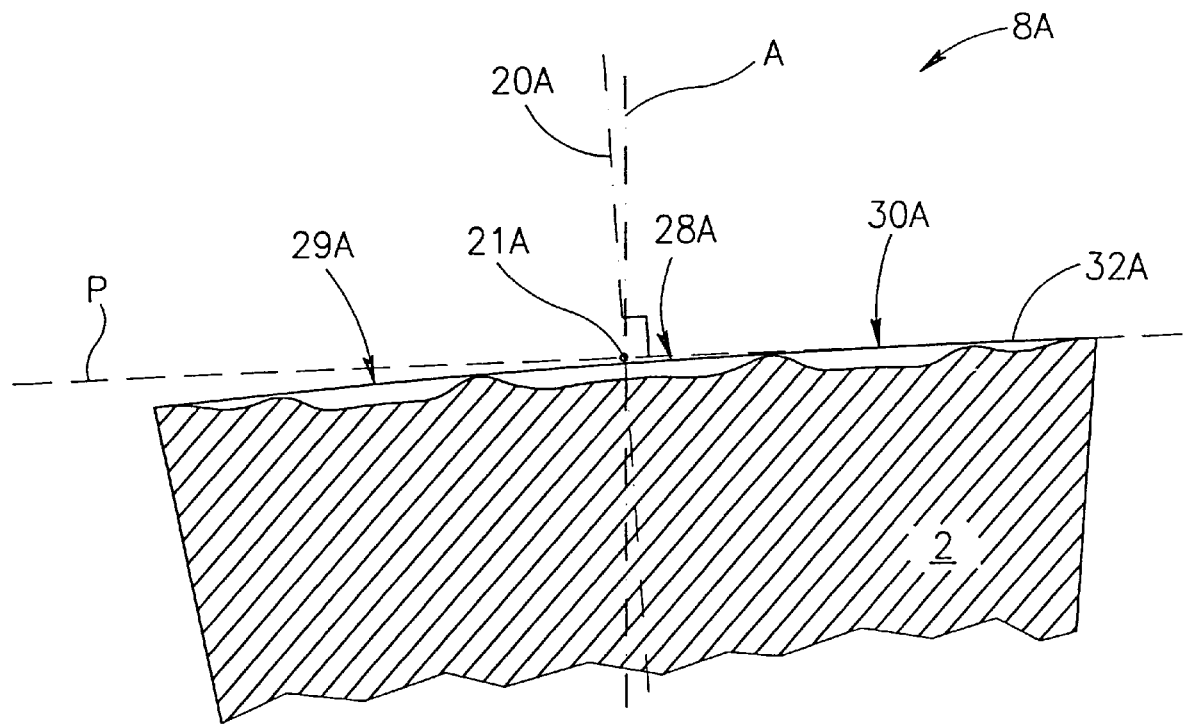
FIG. 4 shows the cross-section of FIG. 3 taken along lines IV—IV.
Figure 5:
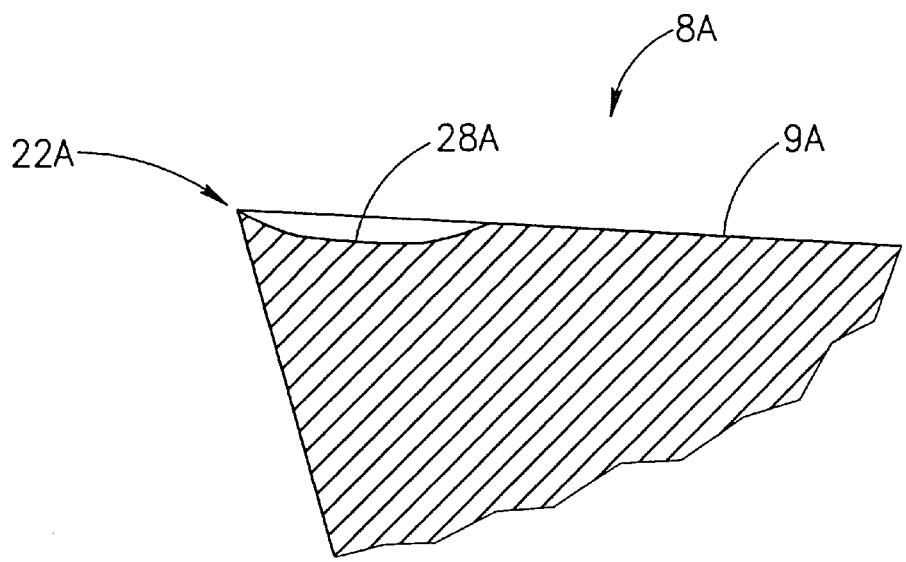
FIG. 5 shows the cross-section of FIG. 3 taken along lines V—V.

FIGS. 3–5 show that the component cutting edges 22A, 23A and 25A are associated with depressions 28A, 29A and 30A, respectively, which are substantially coextensive with their respective component cutting edges and are formed in a generally U-shaped chip control groove 32A. The depressions 28A, 29A and 30A provide localized chip control means for guiding a chip strip from its associated component cutting edge in a substantially opposite direction to the feed direction F whilst the rear wall of each depression 28A, 29A and 30A acts as a chip deflector for breaking its associated chip strip into relatively short chips.

Figure 6:
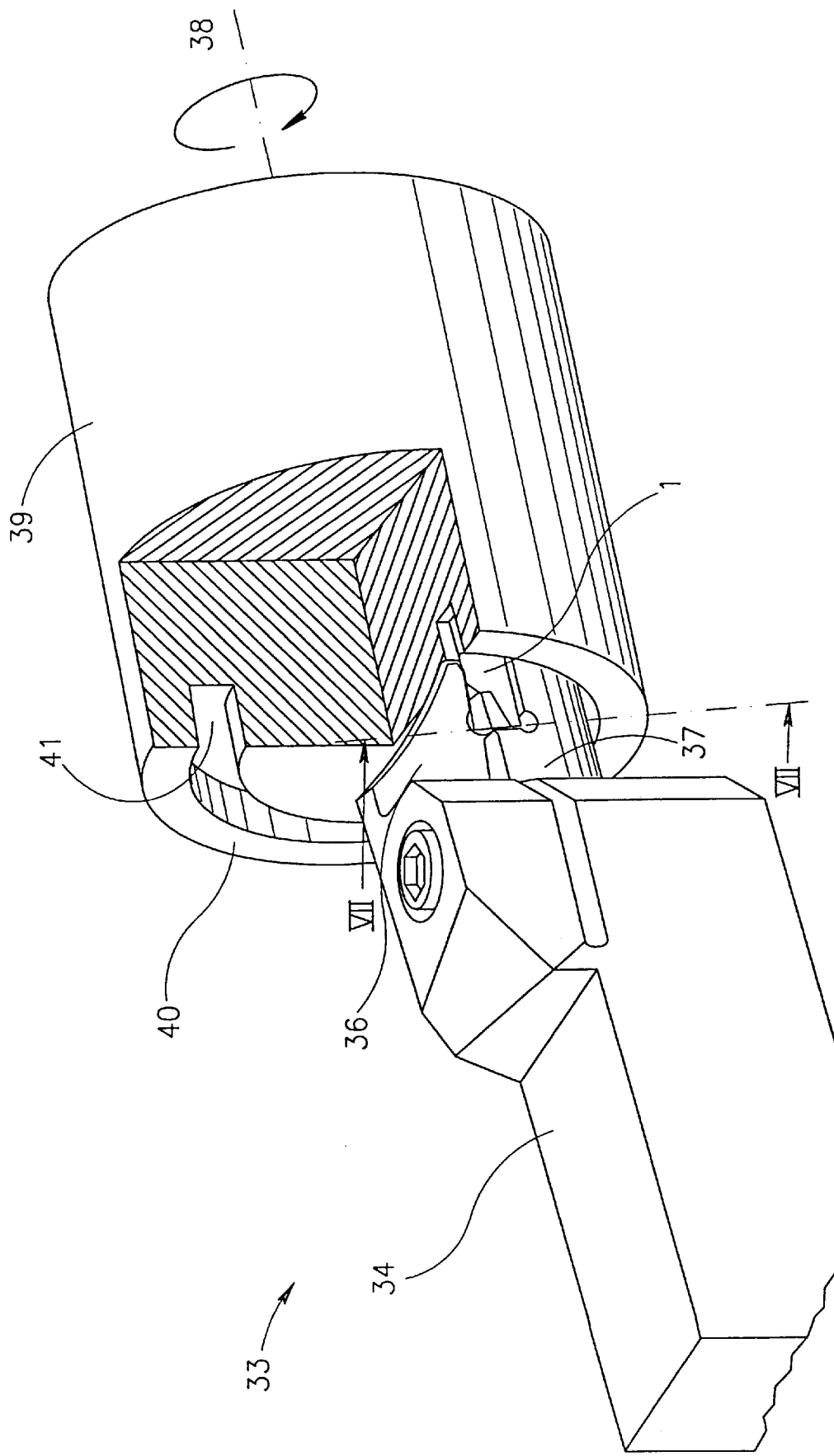
FIG. 6 is a perspective view of a cutting tool assembly employing the cutting insert of FIG. 1 in a face grooving operation.
Figure 7:
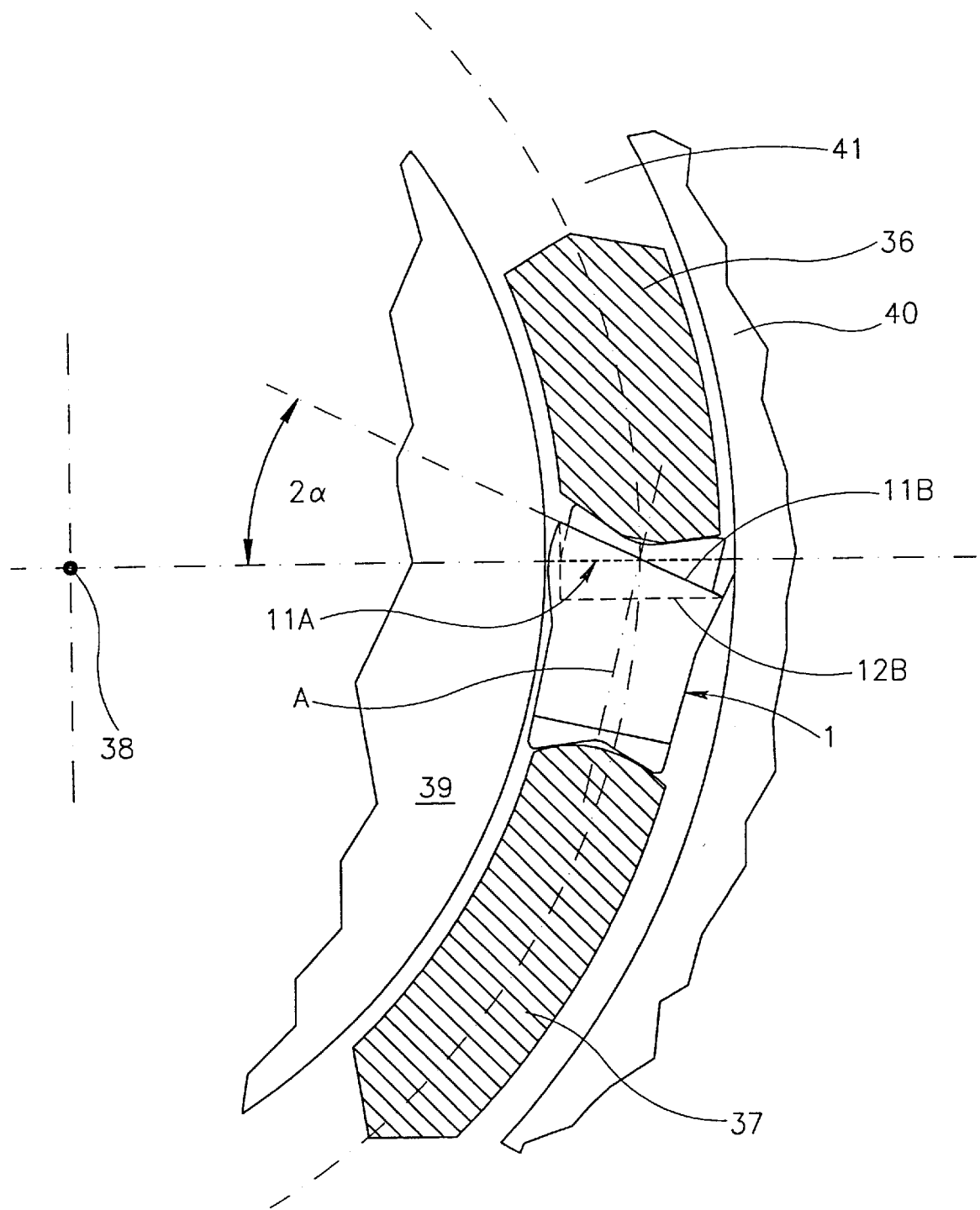
FIG. 7 is a cross section view of the cutting tool assembly of FIG. 6 along line VII—VII.

FIGS. 6 and 7 show a cutting tool assembly 33 with a toolholder 34 having a pair of curved clamping jaws 36 and 37 for clamping a cutting insert 1 such that its leading operative front cutting edge 11A (dotted line) lies on a plane passing through an axis of rotation 38 of a workpiece 39, the workpiece 39 having an end face 40 in which an annular groove 41 is to be cut. As shown, a projection 12B (dashed line) of the inoperative trailing front cutting edge 11B (solid line) on the leading operative front cutting edge 11A has a width less than the width of the latter so that the cutting tool assembly 33 can perform deep face grooving operations.

Figure 8:
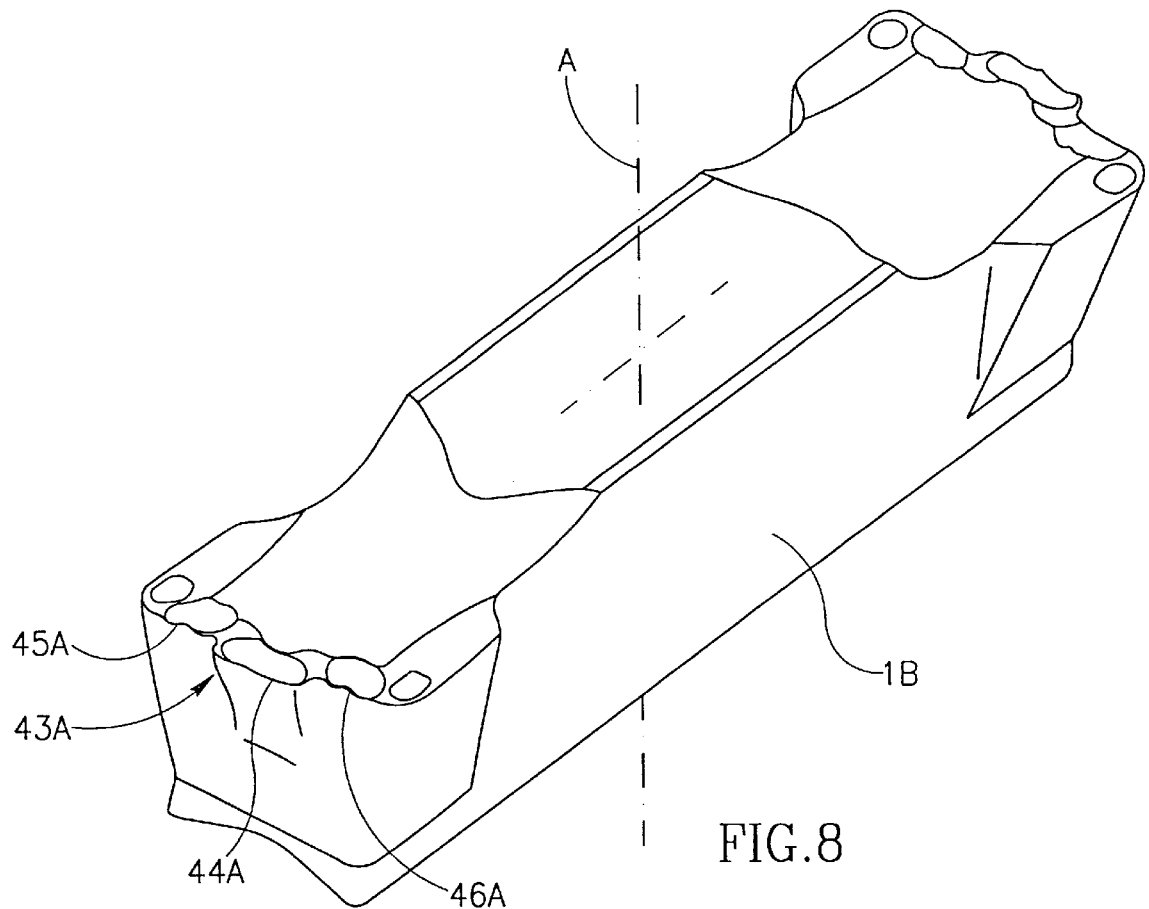
FIG. 8 is a perspective view of a second embodiment of a cutting insert of the present invention.
Figure 9:
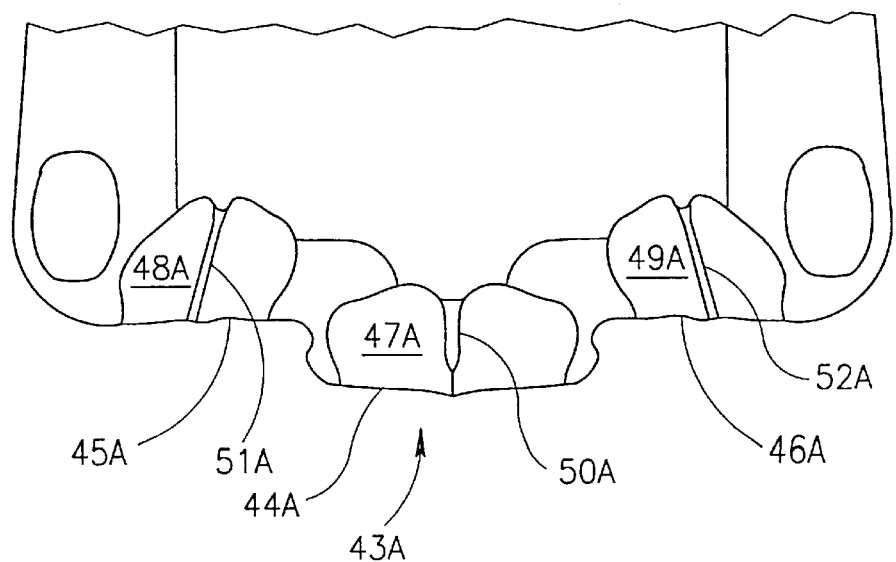
FIG. 9 is a close-up top view of a cutting end portion of the cutting 20 insert of FIG. 8.
Figure 10:
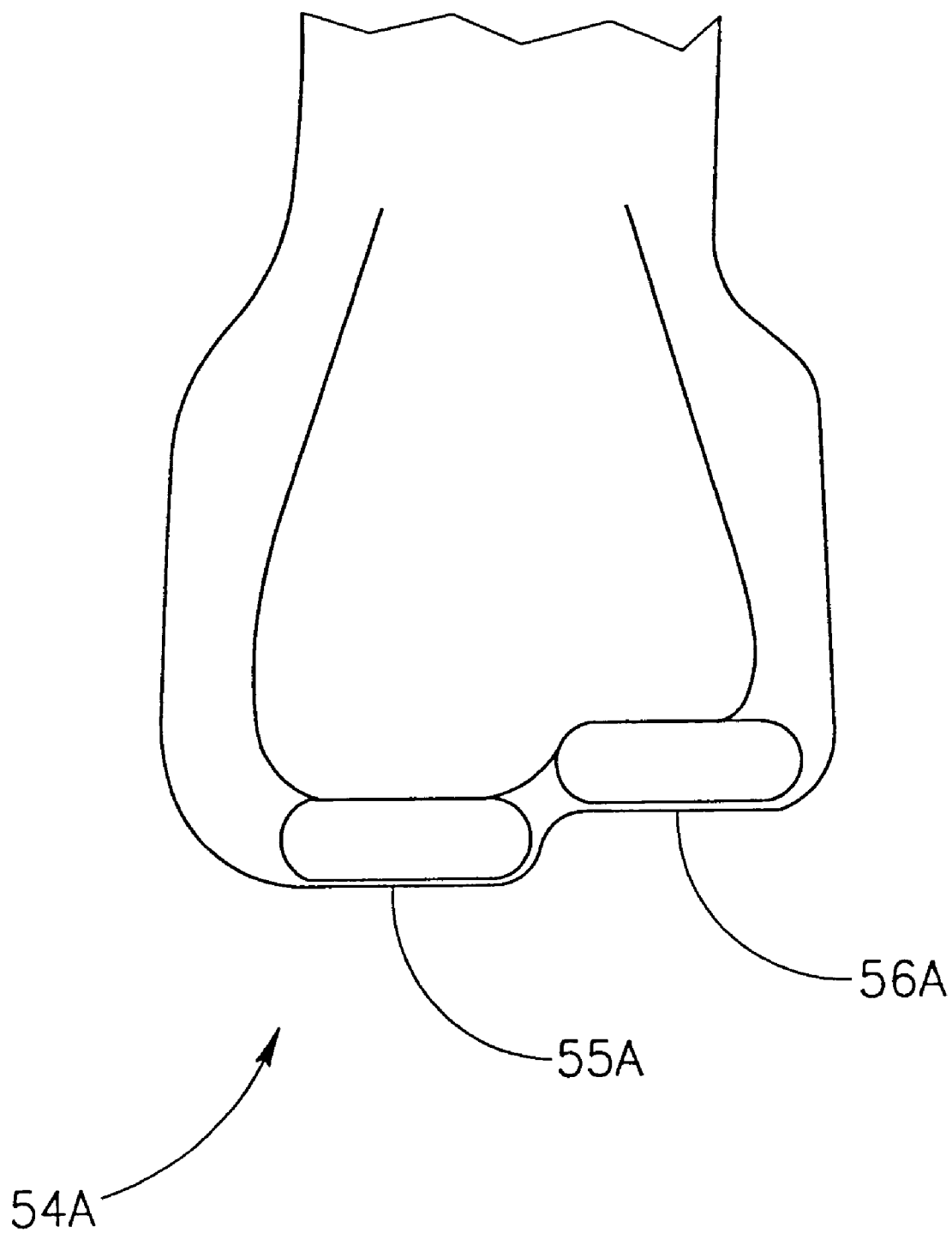
FIG. 10 is a close-up top view of a cutting end portion of a third embodiment of a cutting insert of the present invention.

Whilst the invention has been described in respect of a particular embodiment thereof, it will be appreciated that many variations, modifications and other applications of the invention may be made particularly in respect of the chip control means and their chip breaking means to suit different cutting conditions. For example, as shown in FIGS. 8 and 9, a cutting insert 1B whose features which are identical to those of cutting insert 1 are similarly designated is identical thereto except that it is provided with a generally serrated front cutting edge 43A including component cutting edges 44A, 45A and 46A. The component cutting edges 44A, 45A and 46A are respectively associated with depressions 47A, 48A and 49A respectively having central ridges 50A, 51A and 52A transversely directed to their associated component cutting edges. In addition, a front cutting edge 54A can be provided with two component cutting edges 55A and 56A (see FIG. 10) or more depending on its width. Furthermore, the common bridging sections do not have to be S-shaped but can be any shape provided adjacent cutting edge sections overlap.

I claim:

1. A turning cutting insert comprising:
    an insert body having an upper central clamping surface and a lower clamping surface through which passes an axis of symmetry about which the cutting insert is indexable;
    said insert body having a pair of opposite end portions disposed laterally with respect to said upper clamping surface, each end portion having a rake surface, a front cutting edge, and side cutting edges, the front cutting edges being sloped in opposite senses with respect to said axis of symmetry in an end view of the insert, taken along a line perpendicular to said axis of symmetry and passing through a midpoint of a corresponding front cutting edge;
    each of said front cutting edges having at least two component cutting edges, adjacent component cutting edges overlapping via a common bridging section, thereby providing chip splitting means, said at least two component cutting edges collectively forming a composite front cutting edge, which in said end view of the insert, has a length which exceeds a width of the insert body at said upper central clamping surface, and
    each component cutting edge being associated with a corresponding depression formed in said rake surface.

2. The cutting insert according to claim 1, wherein an adjacent pair of component cutting edges of said at least two adjacent component cutting edges are staggered in respect of one another in a top view of the cutting insert, taken along a line parallel to said axis of symmetry.

3. The cutting insert according to claim 1, wherein said depression is substantially co-extensive with its associated component cutting edge.

4. The cutting insert according to claim 3 wherein said depression includes a raised central ridge transversely directed to its associated component cutting edge.

5. The cutting insert according to claim 1 wherein said front cutting edge is serrated.

6. A cutting tool assembly for face grooving comprising a toolholder with a pair of curved clamping jaws for clamping a cutting insert according to any one of the claims 1–5.

7. A cutting insert comprising:
    an insert body having an upper clamping surface and a lower clamping surface, through which passes an axis of symmetry about which the cutting insert is indexable;
    said insert body having first and second end portions, each end portion being disposed laterally with respect to said upper clamping surface, each end portion comprising a rake surface, a front cutting edge having a midpoint, and side cutting edges, said axis of symmetry being normal to an imaginary reference plane on which midpoints of said first and second end portions lay;
    the front cutting edges of said first and second end portions each being inclined at a non-zero angle α relative to said imaginary reference plane and being inclined at an angle of 2α relative to one another in an end view of the insert, taken along a line perpendicular to said axis of symmetry and passing through said midpoints; wherein
    each of said front cutting edges comprises at least two adjacent component cutting edges which overlap via a common bridging section to thereby present a continuous front cutting edge in said end view of the insert, each of said component cutting edges being associated with a corresponding depression formed in said rake surface.

8. The cutting insert according to claim 7, wherein adjacent component cutting edges are staggered in respect of one another in a top view of the cutting insert, taken along a line parallel to said axis of symmetry.

9. The cutting insert according to claim 7, wherein each of said depressions is substantially coextensive with its associated component cutting edge.

10. The cutting insert according to claim 9, wherein each of said depressions includes a raised central ridge transversely directed to its associated component cutting edge.

11. The cutting insert according to claim 7, wherein each of said front cutting edges is serrated.

12. The cutting insert according to claim 7, wherein said upper and lower clamping surfaces of said cutting insert are each provided with at least one groove.

13. A cutting tool assembly comprising a toolholder with a pair of curved clamping jaws; and a cutting insert retained in said pair of curved clamping jaws, said cutting insert comprising:

an insert body having an upper central clamping surface and a lower clamping surface through which passes an axis of symmetry about which the cutting insert is indexable;

said insert body having first and second end portions, each end portion being disposed laterally with respect to said upper clamping surface, each end portion comprising a rake surface, a front cutting edge having a midpoint, and side cutting edges, said axis of symmetry being normal to an imaginary reference plane on which midpoints of said first and second end portions lay;

the front cutting edges of said first and second end portions each being inclined at a non-zero angle $\alpha$ relative to said imaginary reference plane and being inclined at an angle of $2\alpha$ relative to one another in an end view of the insert, taken along a line perpendicular to said axis of symmetry and passing through said midpoints; wherein each of said front cutting edges comprises at least two adjacent component cutting edges which overlap via a common bridging section to thereby present a continuous front cutting edge in said end view of the insert, each of said component cutting edges being associated with a corresponding depression formed in said rake surface; wherein said upper and lower clamping surfaces of said cutting insert are each provided with at least one groove configured to mate with corresponding surfaces formed on said curved clamping jaws whereby said cutting insert is retained within said clamping jaws.

14. The cutting tool assembly according to claim 13, wherein adjacent component cutting edges are staggered in respect of one another in a top view of the cutting insert, taken along a line parallel to said axis of symmetry.

15. The cutting tool assembly according to claim 13, wherein each of said depressions is substantially coextensive with its associated component cutting edge.

16. The cutting tool assembly according to claim 15, wherein each of said depressions includes a raised central ridge transversely directed to its associated component cutting edge.

17. The cutting tool assembly according to claim 13, wherein each of said front cutting edges is serrated.

* * * * *